United States Patent Office 3,471,593
Patented Oct. 7, 1969

3,471,593
PROCESS FOR PREPARING AMIDO
PHOSPHORIC ACID ESTERS
Eugen Reindl, Burgkirchen an der Alz, and Gunter
Rummert, Burghausen, Salzach, Germany, assignors to
Farbwerke Hoechst Aktiengesellschaft vormals Meister
Lucius & Bruning, Frankfurt am Main, Germany, a
corporation of Germany
No Drawing. Filed Sept. 7, 1966, Ser. No. 577,620
Claims priority, application Germany, Sept. 10, 1965,
F 47,144, Patent 1,238,467
Int. Cl. C07f 9/24; A01n 9/36; C09k 3/16
U.S. Cl. 260—980                                5 Claims

ABSTRACT OF THE DISCLOSURE

A process for preparing amido phosphoric acid esters
by reacting:
 (1) indicated primary, secondary or tertiary amines
     with
 (2) an alkanol, phenol or lower oxyalkylene derivative
     thereof and
 (3) a phosphorylating amount of $P_2O_5$, at a temperature of about 50–200° C. The resulting product has
     utility as biocides or in the antistatic art.

---

The present invention relates to a process for preparing
amido phosphoric acid esters.

Phosphoric acid ester amides have hitherto been prepared from the halogen compounds of phosphorus, in the
most simple case from phosphorus oxychloride which,
in a first reaction, is reacted with an alcohol to yield a
phosphoric ester halide from which the ester amide is
prepared with the aid of ammonia or amine according
to the two equations:

$POCl_3 + ROH \rightarrow (RO)POCl_2 + HCl$ or $POCl_3 + 2ROH \rightarrow (RO)_2POCl + 2HCl$
$ROPOCl_2 + 4R'NH_2 \rightarrow ROPO(NHR')_2 + 2RNH_2 \cdot HCl$ The reaction is carried out in an inert dry solvent
(G. M. Kosolapoff "Organophosphorus Compounds," edition Chapmann & Hall, London, 1950, 279–286; Liebigs
Annalen der Chemie 326, 129 (1903); Berichte der
Deutschen Chemischen Gesellschaft 8, 1235 (1875) 41,
146 (1908); I. R. van Waser "Phosphorus and Its Compounds," Interscience Publishers, New York, vol. I (1958),
831, Am. Chem. J. 15, 198 (1893), 16, 123, 154 (1894)).

On the other hand, it is also possible to react the halogen compounds of phosphorus first with ammonia or
amines to yield phosphoric acid amido halides, which are
then converted with alcohols, approximately according to
the two equations:

$POCl_3 + 2RNH_2 \rightarrow RNHPOCl_2 + RNH_2 \cdot HCl$
$RNHPOCl_2 + 2R'OH \rightarrow RNHPO(OR)_2 + 2HCl$ (Liebigs Annalen der Chemie 326, 129 (1903)). The reaction is also in this case carried out in inert organic
solvents. It is true, however, that the yield was stated to
be 30 to 35 percent, calculated on the phosphorus oxychloride applied. Higher yields are obtained in the case
of the second reaction, which is carried out in the presence of pyridine (Kosolapoff et al., Waser et al., J. Am.
Chem. Soc. 63, 2117 (1941), 64, 1337, 1553 (1942),
Berichte der Deutschen Chemischen Gesellschaft 73, 47
(1940)).

It is, furthermore, known to react tertiary phosphoric
acid esters which, as is well-known, can only be prepared
via phosphorus oxychloride, with ammonia or primary
amines to yield amido phosphoric acids (Am. Chem. J.
16, 123, 154 (1894); Russ. Phys. Chem. Soc. 44, 1106
(1912); U.S. Patent 2,151,380 (1939)). The manufacturing process is carried out in the following stages:

$POCl_3 + 3ROH \rightarrow (RO)_3PO + 3HCl$
$(RO)_3PO + R'NH_2 \rightarrow (RO)_2PONHR' + ROH$ Finally there is known the troublesome method indicated hereunder according to which a tertiary ester is prepared in known manner from phosphorus oxychloride and
alcohol (Equation 1 hereunder), from which ester there
are obtained by further reaction with $P_2O_5$ the esters of
meta-, pyro- and polyphosphoric acid (Equation 2 hereunder) (Chemical Industries 51, 517 (1942), U.S. Patent
2,402,703 (1946), while in a third reaction this ester is
reacted with the amine to yield the phosphoric ester amides (Equation 3 following hereunder) (J. Chem. Soc.
1947, 674; Berichte der Deutschen Chemischen Gesellschaft 44, 2076 (1911); J. Chem. Soc. 1929, 279; U.S.
Patent 2,406,423 (1946)).

(1)  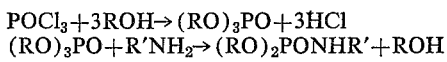

(2)

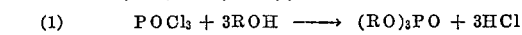

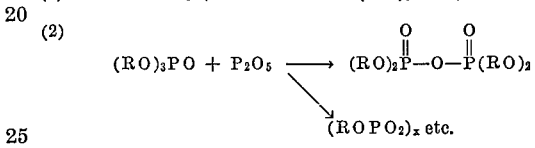

(3a)

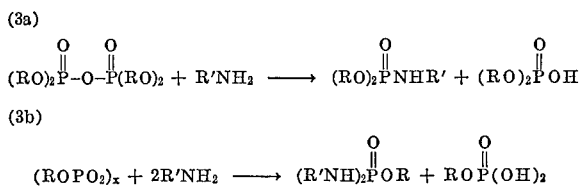

(3b)

$(ROPO_2)_x + 2R'NH_2 \longrightarrow (R'NH)_2POR + ROP(OH)_2$

The known processes for the preparation of phosphoric
ester amides as described above are altogether carried out
in several stages and are, therefore, expensive. Moreover,
the reactions can only be carried out in inert solvents; in
these reactions losses of yield cannot be avoided. The
main difficulties arise from the use of phosphorus halides,
especially phosphorus oxychloride, which is necessary in
all processes. The removal of the necessarily formed hydrogen chloride is very troublesome in many cases. In
most cases it is possible to obtain the phosphoric ester
amides in a state completely free from chlorine with
very considerable expenditure on apparatus only.

Now we have found that the respective ester amides of
phosphoric acid are obtained by a simple quantitative reaction of phosphorus pentoxide with alkylamine and alcohols or phenols, which reaction is carried out in a single
stage.

It is the object of the present invention to provide a
process for the preparation of amido phosphoric acid
esters of alkylamines, which comprises using phosphorus
pentoxide as phosphorylating agent and either first introducing phosphorus pentoxide in the absence of a solvent
or a diluent into molten alkylamine, reacting the phosphoric alkylamides forming in this operation at 80° C. to
90° C. with alcohols or phenols or the oxalkyl derivatives
thereof and terminating the reaction at a temperature
within the range of 120° to 200° C. preferably at 140° C.,
or placing alkylamine and alcohols or phenols and/or
the oxalkyl derivatives thereof and phosphorus pentoxide
into the reaction vessel and reacting them at a temperature
within the range of from 50° to 100° C. in the absence
of a solvent and terminating the reaction at a temperature
within the range of from 120° to 200° C., preferably at
140° C. or first reacting alcohols or phenols and/or the
oxalkyl derivatives thereof with phosphorus pentoxide
without a solvent to yield acid phosphoric acid esters and
allowing these esters to react with alkylamine at a temperature within the range of from 120° to 200° C., preferably at a temperature of 140° C. The characteristic feature of the invention is the use of phosphorus pentoxide as a phosphorylating agent in the absence of a solvent or a diluent.

When working according to the new process, phosphorus pentoxide is first introduced into molten alkylamine thus preparing phosphorus alkylamide, mainly the diamide of pyrophosphoric acid. At a temperature within the range of from 80° to 90° C., the respective alcohol or the respective phenol or the oxalkyl derivatives thereof are added and the reaction is terminated at 140° C. It is also possible to place the alcohol and/or the phenol or the oxalkyl derivatives thereof and the alkyl amine together in the reaction vessel and to react these compounds together with phosphorus pentoxide, or to prepare acid phosphoric acid esters at a moderate temperature from the alcohol and/or phenol or the oxalkyl derivatives thereof and phosphorus pentoxide in known manner and finally to carry out the reaction with alkylamine at a temperature within the range of from 120° to 200° C., preferably at a temperature of 140° C.

Suitable amines are all primary and secondary alkyl amines of the formula:

wherein $R_1$ represents a hydrogen atom or a $(C_1-C_4)$-alkyl group, above all a methyl group, and $R_2$ represents an alkyl or alkene group having 8 to 26 carbon atoms, for example n-octylamine, dodecyl amine, ethyl hexyl amine, methyl dodecylamine, methyl-, ethyl- and butyl-heptadecylamine, primary and secondary fatty amines, such as lauryl amine, oleyl amine, soybean oil amine, stearyl amine, or tallow oil amine. Especially suitable are the commercially available methyl fatty amines. Mixtures of amines may also be used.

As compounds containing hydroxyl groups there may be used all primary, secondary and tertiary mono- and polyhydric alcohols, ether alcohols as well as phenols and the oxalkyl derivatives thereof. There are mentioned, for example: propanols, butanols, octanols, so-called fat alcohols, oxalkylated alcohols such as lauryl-, stearyl- and oleyl-oxalkylates, furthermore phenols, chloro- and nitrophenols and oxylower alkylates thereof.

The products prepared according to the new method are excellent surface-active substances. They may be used as such as biocides or intermediate products or, together with other products, they may be used for various industrial applications, for example as antistatic agents for plastic materials. The phosphoric ester amides prepared by the new process described above, which are applied as anti-static agents, have the considerable technical advantage of being absolutely chlorine-free as compared to the compounds prepared from $POCl_3$ by a conventional method. Due to these compounds being chlorine-free, the undesirable formation of corrosion and deposits on the processing machines and the expensive separation of the amino hydrochlorides forming as by-products are avoided.

The following examples serve to illustrate the invention but they are not intended to limit it thereto, the parts being by weight:

EXAMPLE 1

475 parts lauryl amine (having a medium molecular weight of 190) were melted in an externally heated flask having a capacity of 4 liters and being provided with agitator and thermometer, and 142 parts phosphorus pentoxide were introduced in portions at 120° C. over a period of 2 hours whereby a clear melt was formed. At 100° C. 1900 parts lauryl polyglycol ether (lauryl alcohol + 10 moles ethylene oxide) were introduced into this melt, while stirring continuously and passing through dry nitrogen. At first two layers formed. After some time (duration of the reaction approximately 8 hours) a homogeneous, clear, yellow to slight brown melt formed. The reaction was terminated at 140° C. The after-reaction at 140° C. lasted approximately 2 to 3 hours. The melt solidified at normal temperature to yield a soft wax.

EXAMPLE 2

In a manner similar to that described in Example 1, 498 parts methyl dodecylamine were reacted at 140° C. with 143 parts phosphorus pentoxide in the course of one hour, with vigorous agitation, to form a clear light yellow melt. After cooling to 100° C. 500 parts anhydrous butanol were added, and the esterification was carried out in the course of 5 hours under reflux at the boiling point of the butanol. Then the unreacted butanol was distilled off completely. A yellow clear melt remained which solidified at normal temperature to yield a light yellow wax. As could be determined by vacuum distillation and analysis, there were present mixtures of different ester amides.

EXAMPLE 3

Into the melt of 540 parts of a technical grade methyl stearylamine (having a medium molecular weight of 270) there were introduced, at 120° C., 142 parts of phosphorus pentoxide in small portions in the course of two hours. To complete the reaction, the reaction mixture was heated for another half hour at 140° C. Into the clear melt thus obtained, 2150 parts of a polyglycol ether of dodecanol with 8 moles ethylene oxide were added at a temperature ranging from 90° to 100° C. The separation into two layers that had formed first disappeared at a reaction temperature of 120° C. after some hours. At 140° C. an immediate reaction set in with the formation of a uniform clear, generally brown product which did not separate into layers even at a low temperature (for example 100° C.). At normal temperature the product solidified to form a yellow fatty wax.

EXAMPLE 4

142 parts phosphorus pentoxide were introduced at 120° C. into 510 parts of a technical grade stearylamine. After the bulk of the phosphorus pentoxide had reacted, 810 parts of stearyl alcohol were added in pieces to the molten mass. After a reaction period of 8 hours at 120° C. and an after-reaction of two hours at 140° C., the total amount of phosphorus pentoxide had reacted and a clear, light yellow solution had formed which solidified at normal temperature to yield a hard light wax.

EXAMPLE 5

In a manner similar to that described in Example 2, 490 parts N-ethylhexadecylamine were reacted at 120° C. with 142 parts phosphorus pentoxide to form a clear melt, and then the esterification was carried out with 500 parts anhydrous n-butanol at the boiling point of the butanol in the course of 5 hours. Then, without distilling off the butanol in excess, 310 parts ethylene glycol were added and further heated for 6 hours under reflux of the boiling butanol until finally the butanol distilled at 130° C. and the interchange of ester radicals with glycol was terminated. Finally residues of the butanol set free and of the unreacted glycol were removed in vacuo. This type of interchange of ester radicals of phosphoric ester amides has quite generally proved useful, and side reactions which may occur in the process of esterification could be avoided thereby.

EXAMPLE 6

The process could also be carried out in such a manner that with the use of the same product amounts as described in Example 3, the methyl stearyl amine was reacted together with the dodecyl polyglycol ether with phosphorus pentoxide at 80° to 90° C. To avoid intense discolorations, the addition of phosphorus pentoxide had to take place very slowly and in small portions, which lasted about 8 hours. The reaction mixture was allowed to finish reacting for 6 hours. The properties of the reaction products obtained corresponded to those of the products obtained according to Examples 3 and 4.

EXAMPLE 7

The same product as that described in Example 3 formed by first reacting, at 80° to 90° C., 2150 parts of dodecyl polyglycol ether (with 8 moles ethylene oxide) with 142 parts phosphorus pentoxide to yield acid phosphoric ester and then carrying out the reaction with 540 parts methyl stearylamine at 140° to 160° C., the reaction period amounting to about 18 hours. To avoid an intense discoloration of the product and to attain a faster reaction, it was necessary to pass dry nitrogen through the reaction products or to operate in vacuo.

EXAMPLE 8

400 parts anhydrous pure methyl dodecylamine were reacted in the molten state, at 120° C., with 142 parts phosphorus pentoxide. When the bulk of the phosphorus pentoxide had reacted, which was the case after about two hours, 395 parts 2,4,5-trichlorophenol were added in portions at the same temperature. After a reaction period of another four hours, the reaction mixture was finally heated for a further two hours at 160° C., a homogeneous clear, slightly yellow product forming.

We claim:

1. A process for preparing amido phosphoric acid esters consisting essentially of separately or concurrently contacting at least stoichiometric amounts of
   (1) an amine of the formula:

wherein
   $R_1$ is hydrogen or alkyl of 1–4 carbon atoms and
   $R_2$ is alkyl or alkene of 8–26 carbon atoms;
   (2) an alkanol, phenol or lower oxyalkylene derivatives thereof, and
   (3) a phosphorylating amount of $P_2O_5$ effecting the reaction at a temperature range of about 50–200° C.;
   and recovering the resulting amido phosphoric acid ester product.

2. The process of claim 1 wherein the phosphorus pentoxide is introduced into molten alkylamine in the absence of a reaction solvent or diluent and thereafter contacting with an alkanol, phenol or oxy lower alkyl derivative thereof at a temperature of 80–200° C. and recovering the resulting product.

3. The process of claim 1 wherein the reactants are simultaneously contacted in the reactor.

4. The process of claim 1 wherein the alkanol or phenol or derivative thereof is initially reacted with phosphorus pentoxide and thereafter contacted with the alkylamine reactant at 120–200° C.

5. The process of claim 1 wherein the amine reactant defines:
   $R_1$ is hydrogen or methyl, and
   $R_2$ is alkyl of 8–26 carbon atoms.

No references cited.

CHARLES B. PARKER, Primary Examiner
A. H. SUTTO, Assistant Examiner

U.S. Cl. X.R.

117—138.8; 252—106, 152; 260—551, 920, 959, 984, 999